United States Patent [19]

Spirk

[11] 4,367,890
[45] Jan. 11, 1983

[54] TURBINE SET WITH A GENERATOR FEEDING A NETWORK OF CONSTANT FREQUENCY

[75] Inventor: Franz Spirk, Berlin, Fed. Rep. of Germany

[73] Assignee: Siemens Aktiengesellschaft, Munich, Fed. Rep. of Germany

[21] Appl. No.: 230,329

[22] Filed: Feb. 2, 1981

[30] Foreign Application Priority Data

Feb. 11, 1980 [DE] Fed. Rep. of Germany ....... 3005375
Sep. 26, 1980 [DE] Fed. Rep. of Germany ....... 3037147

[51] Int. Cl.³ .......................................... H02P 13/20
[52] U.S. Cl. ....................................... 290/52; 290/54
[58] Field of Search ........................... 290/43, 54, 52; 415/170 R; 363/60, 61, 65, 10

[56] References Cited

U.S. PATENT DOCUMENTS 3,659,168 4/1972 Salihi et al. ........................ 363/161
4,165,467 8/1979 Atencio ................................ 405/75

FOREIGN PATENT DOCUMENTS 685187 11/1939 Fed. Rep. of Germany ........ 290/52
2406093 11/1979 France .

OTHER PUBLICATIONS

McGraw-Hill; Dictionary of Scientific & Technical Terms ©1974.

Primary Examiner—J. V. Truhe
Assistant Examiner—Shelley Wade
Attorney, Agent, or Firm—Kenyon & Kenyon

[57] ABSTRACT

In a turbine set with an axial flow which is traversed by water and which is coupled to a generator feeding a network of constant frequency, the flow turbine is a propeller turbine with non-adjustable blades. The stator winding of the generator is connected to the network by means of a frequency-controllable converter, in particular a direct converter. The speed of rotation of the turbine set is controllable continuously according to the power to be delivered. In the case of an asynchronous design of the generator, it is advisable to provide the stator with a waterproof jacket on the inside and to flange it into the turbine tube, since the rotor with its cage winding is swept by water.

11 Claims, 5 Drawing Figures

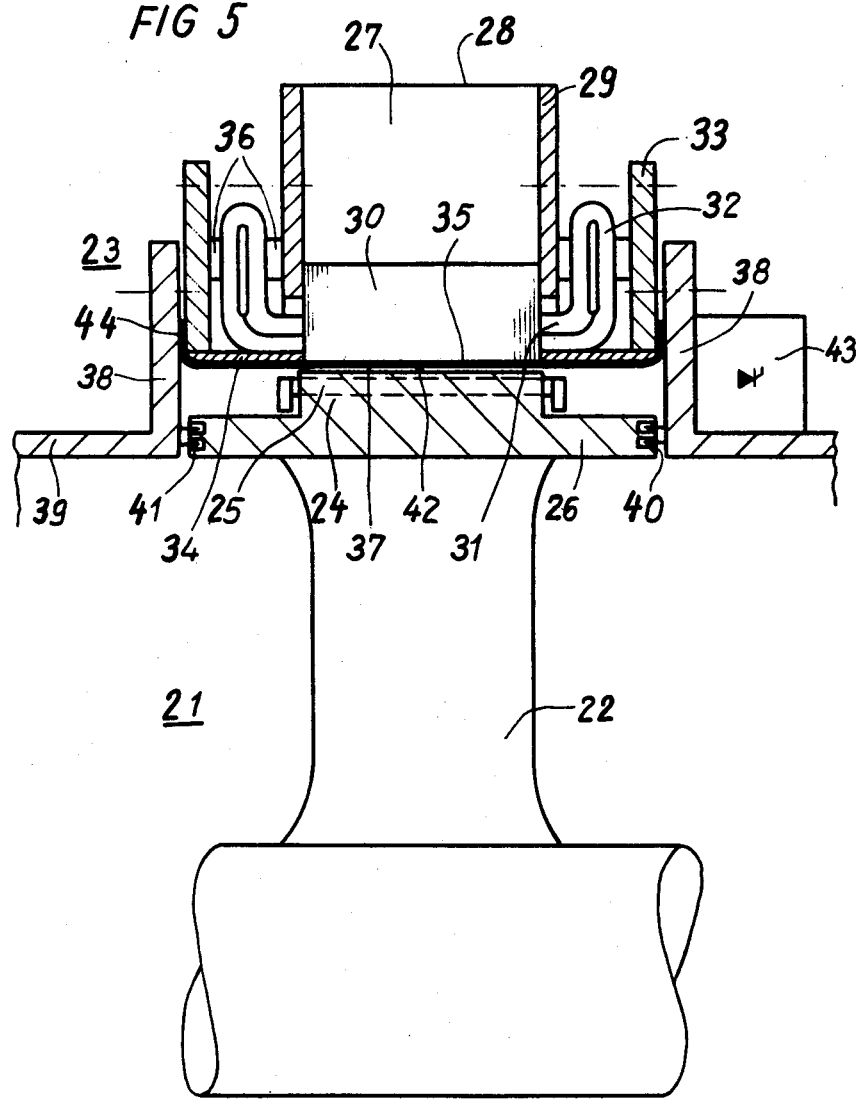

TURBINE SET WITH A GENERATOR FEEDING A NETWORK OF CONSTANT FREQUENCY

BACKGROUND OF THE INVENTION

The invention relates to a turbine set with a turbine which is traversed by water and which is coupled with a generator feeding a constant frequency power distribution network. Such turbine sets are employed to utilize water power for energy generation in particular in river power plants and are known from the literature reference "Bulletin des Schweizer Elektrotechnischen Vereins," 1978, pages 943 to 947.

A distinction is here made between tube turbine sets, where the turbine has a horizontal or slanting shaft, and sets in which the turbine has a vertical shaft. Tube turbine sets were originally designed with a propeller turbine that had fixed blades with the rotor of a generator arranged directly on the outer rim of the runner of the propeller turbine. Such a mechanically simple and sturdily built propeller turbine has the disadvantage, however, that because of the non-adjustability of the blades and because of the constant speed of rotation caused by the generator, the efficiencies at partial load are very poor.

Later, axial flow turbines called Kaplan turbines were developed. These have adjustable runner blades and predominantly vertical shafts and are used in river power plants. A generator lying outside the flow space, and also having a vertical shaft, is connected to the turbine. Also, in tube turbine sets Kaplan turbines with adjustable runners are used in which the generator is located inside a flow body and is driven directly by the shaft of the Kaplan turbine. At this flow body lies inside the water inflow to the turbine, the space available for the generator is limited, which may limit the power output of such generators. For this reason, the use of an outer rim generator has also been provided for a tube turbine set with a Kaplan turbine, with the magnet wheel rim of the generator being mounted on the outer rim of the Kaplan turbine in a hydrostatically separate manner. Such an arrangement is very expensive.

OBJECTS AND SUMMARY OF THE INVENTION

It is the object of this invention to improve the efficiency of a turbine set and its operating properties at partial load.

Another object is to reduce cavitation in the turbine set.

Further objects will be apparent from the specification together with the drawings.

According to this invention, a turbine set of the above described kind is arranged so that the axial turbine is a propeller turbine with a non-adjustable blade and the stator winding of the generator is connected to the power distribution network via a frequency-controllable converter. Thus, the speed of rotation of the turbine set is controllable continuously according to the power to be delivered. This arrangement has the advantage that, because of the frequency-controllability of the converter, the turbine set can be freely adjusted continuously as to speed, so that for every load the optimum speed can be set at the turbine. Good efficiency is thus achieved and uncertainties of operation due to non-adaptation, such as cavitation, are obviated. The expensive mechanical regulation of the turbine runner through adjustable blades for adaptation to the power to be delivered has thus been replaced by electrical speed regulation.

In this way, the propeller turbine known as an axial turbine with non-adjustable blades can be used to advantage both in tube turbine sets with an outer rim generator in a generator disposed in a flow body. It can also be used in a turbine set with a vertical turbine shaft coupled to the vertical shaft of the generator.

It is expedient to design the frequency-controllable converter as a direct converter. Since such a direct converter has a much lower frequency on the generator side than on the network side, the generator can be operated advantageously with a correspondingly low frequency, in particular less than 20 Hz. Because of the much lower alternating current losses, the generator can be designed with a higher utilization coefficient C. This utilization coefficient is determined by the equation:

$$C = (kVA/D_1^2 Ln)$$

wherein $D_1$ is the bore diameter of the generator, L its length, n its speed, and kVA the power delivered. At 20 Hz, the coefficient C can possibly be increased to double the value of a 50 Hz machine. Thereby the cost increase caused by the converter can be compensated at least in part. An additional saving is achieved by the much simpler construction of the turbine.

In a turbine set according to the invention, the generator may expediently be realized in an asynchronous design. To simplify the construction, it is further advantageous, if the rotor of the generator has a squirrel cage winding and the stator is provided on the inside with a waterproof jacket of non-magnetic and electrically non-conducting material, for the rotor to be flanged into the turbine tube watertight. The entire outer rim of the propeller turbine and the generator rotor thereon thus lie inside the driving water space of the turbine. In this way, the heat losses occurring in the cage winding of the rotor during operation of the generator are eliminated in a very simple manner. Moreover, since the stator of the generator is watertight at the inside diameter and is flanged directly into the turbine tube, the previously necessary rotating seals between the rotating outer rim of the turbine and the stationary turbine tube, where water leakages were inevitable, are obviated. Besides, the arrangement has the normal known advantages of the use of an asynchronous machine as generator, i.e. elimination of the exciter system and of the current supply to the rotor via slip rings.

Because of the low frequency of the asynchronous machine, the rotor of the generator may be solid. It is further advisable to incorporate contactless seals, e.g. labyrinth seals, between the outer rim of the propeller turbine and the flanges of the turbine tube, in order to prevent foreign bodies from penetrating into the air gap region of the generator. Because of the pressure difference between the water inlet and outlet at the turbine, the turbine water nevertheless sweeps the entire outer rim and the cage winding.

BRIEF DESCRIPTION OF THE DRAWINGS

FIG. 5 is a somewhat modified tube turbine set shown schematically in longitudinal section.

DETAILED DESCRIPTION OF THE INVENTION

Figure 1:
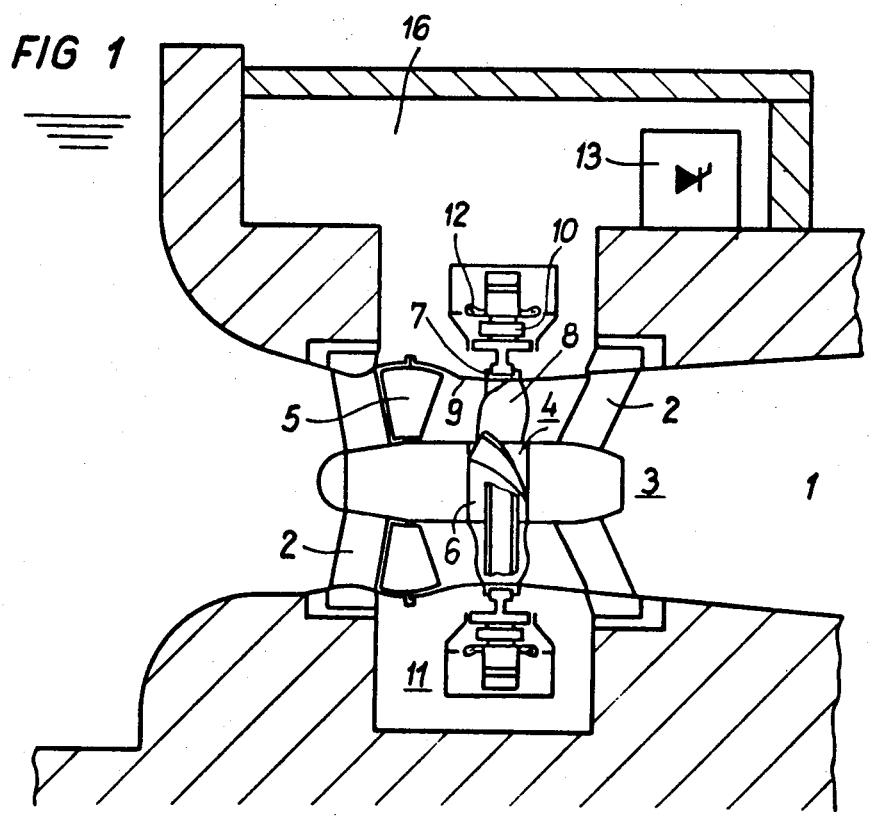
FIG. 1 shows, schematically, a section through a tube turbine set.

A tube turbine set is shown in FIG. 1 in a tubular driving water space 1 of a run-of-river power plant. Between sets of supporting blades 2, there is provided a propeller turbine 3 having a runner 4 with adjustable blades 5 disposed near the front end thereof. The runner 4 is constructed as a one-piece device that has blades 8 integrally cast with a hub 6 and an outer rim 7. The outer rim 7 is sealed against the turbine housing 9 and carries, in addition, a rotor 10 of a generator 11.

Figure 2:
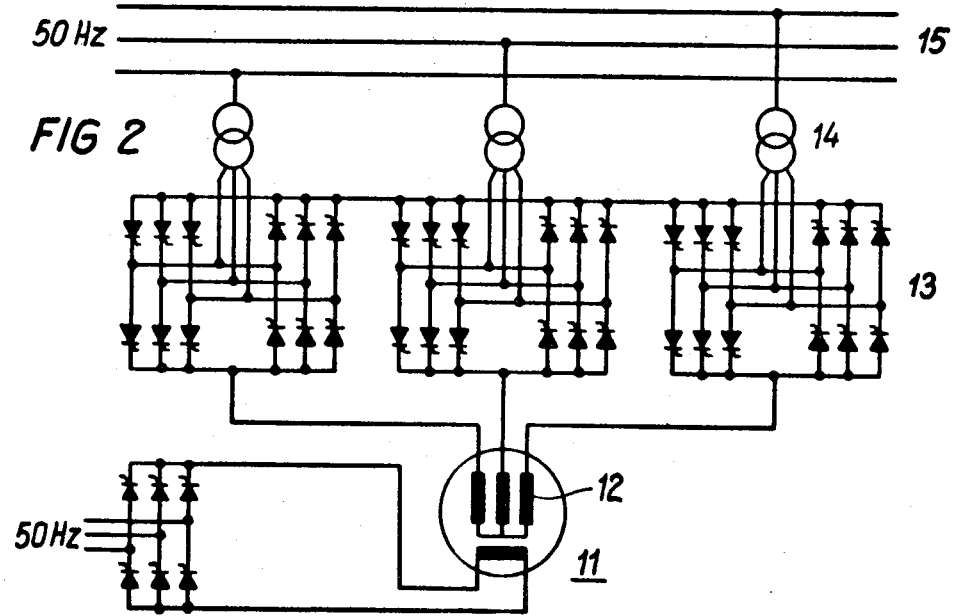
FIG. 2 is a basic diagram of a generator, converter and distribution network.

A stator winding 12 of the generator 11 feeds a distribution network 15 at a constant frequency, e.g. 50 Hz, via a frequency-controllable direct converter 13 and transformers 14. Since the direct converter 13 has a low generator-side frequency, the generator 11 is rated for frequencies less than 20 Hz and has a much higher degree of utilization than a 50 Hz machine. Due to the frequency controllability of the direct converter 13, the generator 11 and the propeller turbine 3 connected with it can be freely varied as to speed continuously, so that the optimum speed can be set on the propeller turbine 3 for every load. Thus, even at partial loads, despite the use of the mechanically very sturdy propeller turbine 3 with non-adjustable blades 8, a very good efficiency is obtained in partial load operation. The direct converter 13 is located in the casing 16 of the tube turbine set, and the connecting lines between the generator 11, the direct converter 13 the transformers 14 and the leads to the network 15 are shown in FIG. 2 and are designed in the usual manner.

Figure 3:
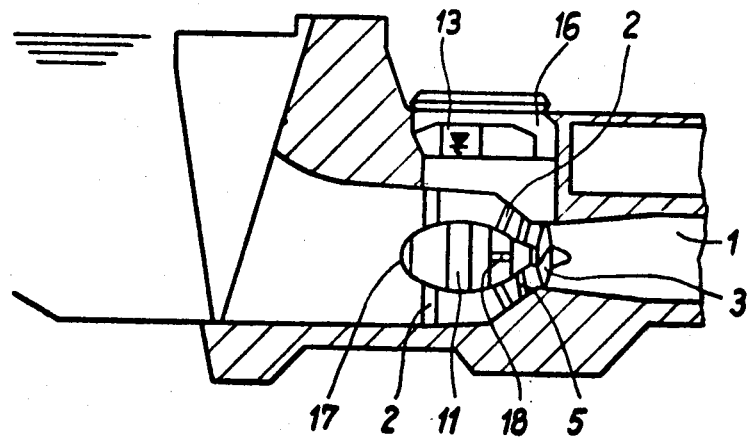
FIG. 3 shows a section through another tube turbine set.

FIG. 3 shows a run-of-river power plant with another tube turbine set with a flow body 17 arranged in the driving water space 1 over supporting blades 2. At the end of the body 17 is the propeller turbine 3. A horizontal shaft 18 of the propeller turbine 3 also drives the generator 11 inside the supporting body 17 and is indicated only schematically. Here, also, the direct converter 13 is lodged inside the casing 16.

Figure 4:
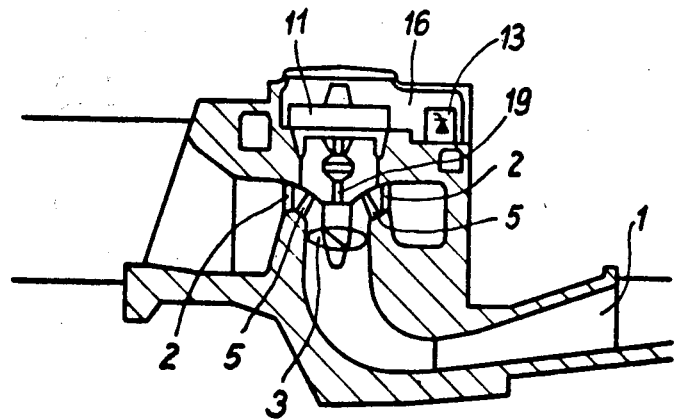
FIG. 4 is a section through a turbine set with a vertical shaft.

FIG. 4 shows an axial turbine set with a vertical shaft 19 and is designed as a propeller turbine 3, with the shaft 19 driving the generator 11. In this embodiment, the direct converter 13 is also lodged in the casing 16. By the use of a propeller turbine 3 instead of a Kaplan turbine heretofore customary in such turbine sets with vertical shafts, the hydraulic part is greatly simplified. Yet this requires no major additional expenditure with respect to the speed regulation of the turbine set now effected electrically through the direct converter 13, as there is enough space for the converter inside the existing casing 16.

The modified turbine set illustrated in FIG. 5 consists of a propeller turbine 21 with a stationary blade 22 and an asynchronous generator 23 having a rotor 24 with a cage winding 25 carried directly by the outer rim 26 of the propeller turbine. Both the rotor 24 and the outer rim 26 are solid. The generator 23 has a stator 27 that consists of a housing 28 having annular walls 29 that carry stator laminations 30 on which a stator winding 31 is mounted. To minimize the axial length of stator 27, a winding head 32 of the stator winding 31 is bent at an angle of 90° to the central part of the winding 31. The head extends parallel to the end faces of the stator laminations 30 and the annular walls 29. Axially outward of the winding head 32 is an annular disk 33 with its inner perimeter fitting around a ring 34 of non-magnetic steel contiguous with the stator laminations 30. The diameter of the internal bore 35 of the stator laminations 30 is the same as the inside diameter of the ring 34, and thus both form the inner surface of the stator 27. The annular walls 29 of the housing 28, the ring 34, and the annular disk 33 are connected together to form a rigid structure. The winding head 32 is further stiffened opposite the latter by supporting elements 36 of plastic. Both ends of the stator are the same.

In addition, the inside of the stator 27 is coated with a waterproof jacket 37 of non-magnetic and electrically non-conducting material, the edges 44 of which are extended over the outer annular disks 33. This waterproof jacket 37 may, for example, consist of glass fiber-reinforced resin.

The entire stator 27 of the generator 23 is secured to the flanges 38 of the turbine tube 39 with the aid of fastening means that are not shown. The stator 27 is thus flanged into the turbine tube 39 watertight and limits the driving water space. The water pressure is absorbed at this point by the stator laminations 30 and the rings 34, not by the jacket 37, which is essentially, only a waterproof seal. The rotor 24 of generator 23 with its cage winding 25 thus lies in the driving water space and the water passes through it. Between the flanges 38 and end faces 40 of the outer rim 26 are labyrinth seals 41 which prevent the penetration of coarse foreign bodies into the air gap 42 of generator 23 and which help to keep the water flowing smoothly through turbine blade region.

The heat losses occurring in the cage winding 25 during operation of the generator 23 are removed in a simple manner by the driving water. The stator winding 31 of generator 23 feeds the power distribution network via the frequency adjustable direct converter 43 and the transformer of the constant network frequency. Because of the frequency adjustability of the direct converter 43, the generator 23 and the propeller turbine 21 connected thereto can be adjusted continuously, so that the propeller turbine 21 may be adjusted to an optional speed for each load and for each hydraulic height, or water head. Thus, even with partial load operation a very good effect is achieved in spite of use of the mechanically very robust propeller turbine 21 with non-adjustable blades 22.

What is claimed is:

1. In a turbine set for supplying electric power to a distribution network operating at a fixed network frequency of 50 or 60 Hz comprising:
   a turbine traversed by water and comprising a shaft and fixed blades;
   a generator having a rotor and a stator with windings, said rotor coupled to said shaft; and
   a frequency-controllable converter coupling the generator stator winding to the network, the improvement comprising:
   (a) said generator adapted to operate at a frequency of less than 20 Hz;
   (b) said frequency-controllable converter being a direct converter; and
   (c) the speed of rotation of the turbine being continuously controllable to obtain optimum efficiency at the power being delivered.

2. The invention according to claim 1 in which the frequency-controllable converter is a direct converter.

3. The invention according to claim 1 in which the generator generates power at a frequency less than about half the network frequency.

4. The invention according to claim 1 in which the turbine is a propeller turbine comprising a runner, the generator rotor carried on the outer rim of said runner and the rotor of the generator has a cage winding and the generator further comprises a waterproof jacket of non-magnetic and electrically non-conducting material flanged into the turbine tube watertight; the stator being located in the jacket.

5. The invention according to claim 1 comprising, in addition, a body flow, the generator being located in the flow body and being connected to the shaft of the turbine.

6. The invention according to claim 1 in which the turbine has a first vertical shaft and the generator has a second vertical shaft connected to the first shaft.

7. The invention according to claim 4 in which the generator is an asynchronous generator.

8. The invention according to claim 8 in which the watertight jacket of the stator consists of glass fiber-reinforced plastic.

9. The invention according to claim 8 in which the winding comprises a head bent at an angle of 90°.

10. The invention according to claim 8 in which the rotor of the generator is solid.

11. The invention according to claim 8 comprising contactless seals disposed between the outer rim of the turbine and the flanges of the turbine tube.

* * * * *